United States Patent [19]
Church

[11] 3,709,457
[45] Jan. 9, 1973

[54] APPARATUS FOR FORMING AN INSULATING MEMBER IN SITU ON A LAMINATED MAGNETIC CORE

[75] Inventor: Ralph E. Church, Fort Wayne, Ind.

[73] Assignee: General Electric Company, N.Y.

[22] Filed: Dec. 17, 1970

[21] Appl. No.: 99,049

[52] U.S. Cl....................................249/91, 425/129
[51] Int. Cl. .................................................B29f 1/10
[58] Field of Search...............18/5 E, 30 UM; 249/91; 425/129, 123

[56] References Cited

UNITED STATES PATENTS

| | | | |
|---|---|---|---|
| 1,502,343 | 7/1924 | MacPherson | 18/5 E X |
| 2,361,348 | 10/1944 | Dickson et al. | 18/30 UM X |
| 2,369,291 | 2/1945 | Frank et al. | 18/30 UM UX |

FOREIGN PATENTS OR APPLICATIONS

| | | | |
|---|---|---|---|
| 1,496,387 | 0/1967 | France | 18/30 UM |

*Primary Examiner*—H. A. Kilby, Jr.
*Attorney*—John M. Stoudt, Radford M. Reams, Ralph E. Krisher, Jr., Frank L. Neuhauser, Joseph B. Forman and Oscar B. Waddell

[57] ABSTRACT

Winding accommodating laminated structures having insulating member formed in situ thereon and method and apparatus for making same. Insulating member may include winding retaining elements that are useful while arranging one or more windings on the structure and for maintaining the winding in a desired position on the structure. Insulating member may be used to secure individual laminations together and may include winding termination holding and protecting means.

A preferred method includes forming an insulating member in situ on a stack of laminations which may be variable in height by placing the laminations in a mold cavity, closing a mold with a sufficient force to contain unhardened insulating material to be later admitted to the cavity and urging the laminations against an abutment in the cavit ywith a force less than the force used to close the mold. The apparatus includes mold parts that can accommodate laminations stacked to various heights and includes stack height accommodating means which may be spring biased pressure pins. The overall dimension of the insulated structure is preselected and fixed for a given nominal lamination stack height and variations in dimensions that would otherwise occur due to variations in stack height is taken up or compensated for by the formation of a layer of insulating material having a correspondingly increased or decreased thickness.

7 Claims, 22 Drawing Figures

PATENTED JAN 9 1973

INVENTOR.
Ralph E. Church,
BY Ralph E. Krisher Jr.
Attorney.

APPARATUS FOR FORMING AN INSULATING MEMBER IN SITU ON A LAMINATED MAGNETIC CORE

BACKGROUND OF THE INVENTION

This invention relates in general to electrical devices including one or more wound coils and more particularly to apparatus for use in making structures, having an insulating member supported thereon, for use in such devices. The invention is more particularly and concisely described in connection with apparatus illustrated as being utilized in the manufacture of parts for electric motors.

Many fractional horsepower, relatively low cost, electric motors are conventionally formed with a generally U-shaped laminated yoke section having a rotor receiving bore in the bight portion of the U as described for example in the Myron D. Tupper U.S. Pat. Nos. 3,014,140 and 3,024,377 which issued on Dec. 19, 1961 and Mar. 6, 1962 respectively, and which are assigned to the assignee of this application.

Since the general types of motor construction described in the Tupper patents are now known in the art, further detailed description of the general features and characteristics of such motors will not be specifically set forth herein; and the disclosure of such Tupper patents are specifically incorporated herein by reference.

It is generally recognized that it is necessary to provide means for insulating a motor winding formed of one or more coils from the winding accommodating structure of the motor. Various approaches and techniques used in the past have included the placement of an insulating material around selected portions of the coil accommodating structure and have, at times, included means for positioning the coil turns on the coil accommodating structure.

In the case of the motors shown and described in Kaeding U.S. Pat. No. 3,270,227 (issued Aug. 30, 1966) "integral insulation" may be placed on the winding accommodating structure to provide a ground insulation system. Suitable thermosetting resins may also be used to form a covering for the winding, provide an outer insulation system for the winding, and also firmly and fixedly position the winding on the coil accommodating structure.

In still other approaches, the ground insulation may be formed by insulating tape or by a hardened coating of thermoresponsive material that is applied by brushing or dipping. All of these approaches have turned out to be relatively expensive in actual practice.

In each of these approaches, some means must be provided to secure together a stack of laminations at least until the ground insulation has been permanently formed on the lamination stack. Frequently, weld beads or rivets have been used for this purpose. This in turn has contributed to increased manufacturing expense and, in general, has contributed to increased core losses during motor operation.

Still another approach that has been used heretofore in fractional horsepower sized motors has included the use of a coil bobbin made of one, two, or more molded parts that are assembled together on an elongated stack of laminations. Wingler et al. U.S. Pat. No. 3,189,772 which issued June 15, 1965 illustrates one of these approaches.

The use of preformed insulating bobbins or bobbin parts are often desirable for economic reasons, but this approach too is not completely satisfactory. When lamination stacks are formed from laminations having non-uniform sections, as for example, by having enlarged end sections or enlarged sections intermediate the ends of the laminations (as clearly revealed for example in the aforementioned Tupper U.S. Pat. No. 3,024,377), use of a bobbin with a sleeve having a bore passable over the enlarged sections results in the formation of large air gaps between the lamination stack and bobbin. This, in turn, decreases the heat transfer rate from the winding to the lamination stack and reduces the magnetic flux density induced in the laminations during energization of the winding.

Furthermore, even when generally rectangular shaped laminations are used to form the coil accommodating structure of the motor (as suggested for example in the Wingler et al. patent), air gaps between the core and bobbin still occur due to the tolerances that must be provided to assure that a bobbin may be readily assembled on a laminated core. This problem is aggravated by the relatively great variations that occur during manufacture of a laminated core and particularly so in those cases where laminations are bonded together. This approach is also expensive since the bobbins must be preformed, handled, and then assembled on the stack of laminations. Furthermore, some means should normally still be used to secure the laminations together prior to slipping the bobbin thereon.

Then, after a bobbin is slipped onto a stack of laminations, means such as an adhesive or varnish applied by varnish treatment are used to secure the bobbin to the lamination stack.

Although the above problems have been discussed with particular reference to fractional horsepower motors, it will be appreciated that these problems may also be encountered in the manufacture of other devices. Thus, it will be seen that the resolution of these and other problems would be particularly desirable.

SUMMARY OF THE INVENTION

Accordingly, it is an object of the present invention to provide an improved apparatus for molding an insulating member in situ on a stack of laminations and having means for compensating for stack height variations.

It is another object of the present invention to provide an improved molding apparatus wherein a structure within a mold cavity is held substantially independently of the forces used in closing the mold.

Apparatus embodying the invention in one form may be used to advantage in the manufacture of a winding accommodating structure that includes a winding accommodating stack of magnetic laminations with an insulating member formed in situ thereon and in intimate engagement with selected surfaces of the lamination stack. As used herein, "winding" is meant to include one or more coils, each having one or more turns of an electrical current carrying conductor, and "winding accommodating" is meant to describe a structure that may be used to support or otherwise accommodate one or more windings whether connected in series or parallel and whether one or more windings are or are not inductively coupled.

An inductive device core comprising a stack of inductive laminations of a desired shape or configuration is held in assembled relation with a formed in situ insulating member, the insulated core being fabricated with apparatus embodying the invention in one form. Furthermore, the insulating member includes means in the form of a pair of "sideboards" or flanges for maintaining a winding in a desired position on the structure. Both of the flanges include at least one receptacle for receiving and protecting winding terminations.

The overall dimension of the insulated structure is fixed, and the thickness of insulating material adjacent one end lamination is fixed. The lamination stack height, however, is a variable from stack to stack, and the thickness of insulating material adjacent the other end lamination compensates for the deviation of lamination stack height from a preselected maximum permissible stack height.

With apparatus embodying the invention, an insulating member may be formed in situ adjacent to selected surfaces of a stack of winding accommodating laminations. Use of the apparatus includes positioning a stack of laminations in a mold cavity, and compressively holding the stack against a locating surface or abutment with a force preselected for that purpose while holding closed cavity defining mold members together with a mold closing force that is substantially independent of and isolated from the compressive force applied to the stack of laminations within the mold cavity. Thereafter unhardened insulating material is moved into the closed cavity and hardened, after which the stack of laminations and an insulating member formed in situ thereon are removed as a unitary structure. Apparatus that may be used includes, in one form, a mold including a plurality of mold parts which are relatively movable to define a closed cavity and power means for opening and closing the mold. Also provided are means for locating a stack of laminations having a stack height within a predetermined range of stack heights. The mold also includes means for compensating for variations in stack height that accommodate the cavity to a stack of laminations located therein. In one form this means substantially isolates a stack within the cavity from the mold closing forces and includes a plurality of stack holding or clamping elements that are interconnected through a lost motion connection to one of the mold parts.

BRIEF DESCRIPTION OF THE DRAWINGS

For a better understanding of the invention, reference may be had to the accompanying drawings wherein like reference numerals have been used to denote identical parts.

FIGS. 17 through 18 schematically illustrate apparatus embodying the invention in one form; and, more particularly.

DESCRIPTION OF THE PREFERRED EMBODIMENTS

Figure 1:
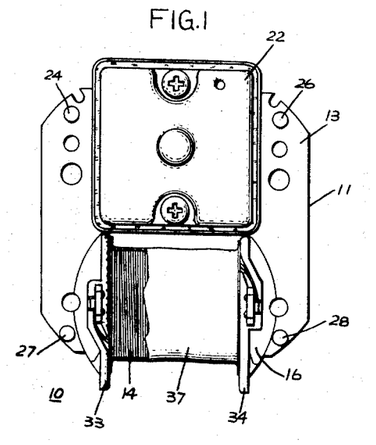
FIG. 1 is an elevational view, with parts broken away, of an electric motor with parts thereof fabricated by utilization of apparatus embodying my invention in one form.
Figure 2:
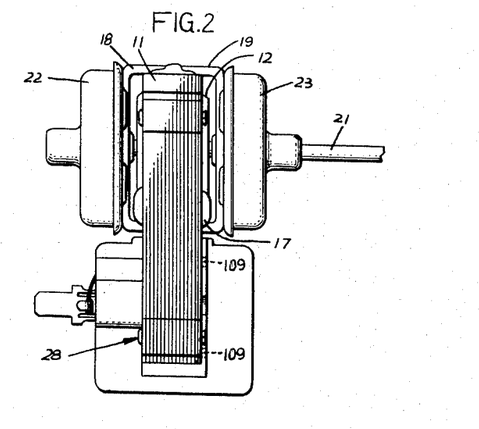
FIG. 2 is a side view of the motor in FIG. 1.

Referring now to the drawings, for purposes of illustration I have shown an electric motor 10 of the shaded pole type for the purpose of describing one preferred exemplification of the invention. The motor 10 conventionally includes a stator 11 and rotor 12, with the rotor being positioned between a pair of oppositely disposed pole faces provided on a main yoke section 13 of stator 11. As will be understood, the rotor is activated during operation by means of magnetic flux which is provided upon excitation of an electrical winding 14 which is supported on a stack of coil accommodating magnetic laminations which, for purposes of illustration, have been shown as a core section 16 of the stator 11.

At the beginning of operation of the motor 10, magnetic flux passes through the yoke section 13 and between the pole faces. Suitable shading coils, for example, coil 17, are provided at the trailing ends of the stator pole faces, and affect, in known fashion, starting torque and running torque of the motor.

End frames or brackets 18, 19 support suitable bearings for opposite end portions of a rotor shaft 21. The bearings may be advantageously formed as described for example in Baclawski U.S. Pat. No. 3,168,663 but are hidden in FIGS. 1 and 2 by oil covers 22, 23.

Other structural details of the motor 10, not now specifically described are as in the aforementioned Baclawski patent. Accordingly, the disclosure of U.S. Pat. No. 3,168,663 is incorporated herein by reference. Thus, the rotor includes a squirrel-cage winding carried by suitable slots in a laminated core and the main yoke section 13 of the stator is comprised of a stack of magnetic laminations held together by any suitable means such as, for example, rivets 24, 26, 27, 28 as shown in FIGS. 1 and 2.

As will be appreciated by now referring to FIGS. 3 through 7 in conjunction with FIGS. 1 and 2, the winding accommodating structure used in the formation of core section 16 includes an insulating member formed in situ on a stack of winding accommodating laminations and in intimate engagement with selected surfaces of the stack of laminations. In the exemplification, this insulating member 30 includes a body portion 31 intimately engaging the surfaces of the stack of laminations 32 adjacent thereto. This results in improved heat dissipation from the winding and improved leakage current characteristics as will be set forth in more detail in the concluding portion of this specification. The member 30 also includes a pair of projecting elements, illustrated as sideboards or flanges 33, 34, which may include one or more winding termination receiving or receptacles as illustrated for example at 35, 36. These flanges also provide means for retaining the winding 14 in a desired position upon the core section 16. Further, it will be understood that one or more additional flanges may also be provided to separate two or more windings, e.g., when a transformer winding is arranged on a core section with a motor winding. In the motor 10, after placement of the winding on the core section 16, means in the form of electrical insulating tape 37 are used to protect the outer turns of the winding.

Figure 3:
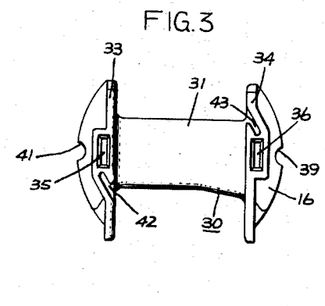
FIG. 3 is a view of a winding accommodating stack of laminations with an in situ formed insulating member that may be used in the manufacture of the motor shown in FIG. 1.
Figure 4:
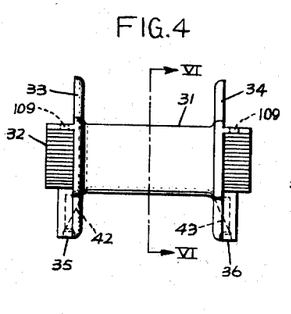
FIG. 4 is an elevational view of the structure shown in FIG. 3.
Figure 5:
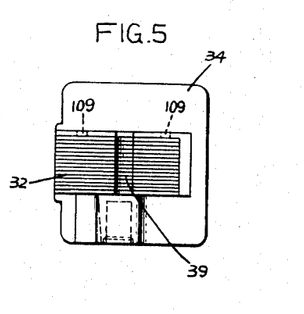
FIG. 5 is an end view of the structure shown in FIG. 4.

One advantage, among others, associated with the FIG. 3 structure is the elimination of rivets, welds, or other fasteners for holding the laminations 32 together as an assembled stack, since the formed in situ insulating member 30 serves as a fastening means for holding the laminations 32 together. In addition to eliminating the labor involved in welding or securing rivets to stacks of laminations, use of the insulating member 30 as a stack fastening means also eliminates the need to reduce the effective magnetic cross-section of a laminated core that would result by providing rivet holes or alignment keyways along or through the lamination stack. Thus, when utilizing the advantage of securing the lamination stack together with the insulating member 30, the magnetic flux carrying capacity of a given lamination will be improved as compared to performance of the same stack with rivet holes therethrough.

To provide a basis for evaluating this advantage, a study has been made of the saturation characteristics of a core section constructed corresponding to the structure 16 illustrated in FIGS. 3–6; a similar structure with rivet holes therein; and still another structure arranged according to prior practice.

In structures corresponding to the FIG. 3 exemplification, a stack of laminations 32 were assembled with a stack height of approximately one-half inch. Iron laminations were used, each having a thickness of about 0.025 inches. The winding in this test structure comprised 1800 turns of 0.0080 inch diameter copper wire. No rivet holes were formed in the laminations and a formed in situ insulating member held the stack together. Test data for this type of structure is presented to the column identified as "Type III" in Table I below.

The column identified as "Type II" in Table I contains data corresponding to data empirically obtained for a construction similar to the "Type III" structure with the exception that two rivet receiving passageways approximately one-eighth inch in diameter were provided in the one-half inch lamination stack. These passageways extended through the stack and were spaced approximately one inch apart and about one-half inch from the alignment ways corresponding to ways 39, 41 shown in FIG. 3. A formed in situ insulating member similar to member 30 was used to secure together the Type II lamination stack, and the structure was wound with 1800 turns of 0.0080 inch diameter copper wire.

Data for still another type of construction, referred to as "Type I" in Table I below was obtained. In this arrangement, a one-half inch stack of laminations similar to the Type II stack were secured together with approximately one-eighth inch diameter steel rivets so that the rivet holes were essentially filled with ferromagnetic material. This stack of laminations was then provided with an "integral insulation" coating as taught heretofore. Thereafter, a winding similar to the windings provided for the Type III and Type II test specimens was placed on the Type I devices.

In order to avoid variations during testing, a special magnetic structure was used to form a continuous magnetic circuit through the core sections. This special magnetic structure comprised a one-half inch stack of generally C-shaped laminations with which each test stack was assembled during testing in order to avoid variable results that might otherwise have occurred due to variations between rotors, rotor to stator air gap, and stator variations in an actual motor construction.

The tests were performed as follows: For each test set up, one of the wound core sections was assembled with the special magnetic test structure and the ends of the winding were connected to a 60 Hz source. Four different levels of voltage were applied and the amount of power input to the coils, measured in watts, was measured for each voltage. The test voltages were 90 volts, 115 volts, 130 volts, and 140 volts. Several readings were taken and the power input data recorded for each of the wound structures being tested. This data was then plotted as points of a graph and curves fitted to the plotted points with voltage as the ordinate and watts input as the abscissa on the graph. Readings taken from these curves for voltage values of 90, 115, 130, and 140 are presented below in Table I.

Table I

| Applied Voltage at 60 Hz (volts) | Power Input (watts) | | |
| --- | --- | --- | --- |
| | Type I | Type II | Type III |
| 90 | 1.15 | 1.05 | 1.00 |
| 115 | 1.95 | 1.90 | 1.65 |
| 130 | 2.8 | 3.25 | 2.25 |
| 140 | 3.75 | 5.50 | 2.75 |

Since the above data was obtained using a special magnetic circuit, it will be understood that the data cannot be exactly compared to actual motor performance. However, the data is believed to accurately represent the relative saturation characteristics of motors embodying the present invention in a preferred and alternate form, and of motors of conventional form utilizing Type I structures.

From a review of the Table I data, it will be appreciated that, when the invention is practiced in its preferred form (Type III), less watts input would be required, for the approximately same flux density in the magnetic circuit, than would be required with a more conventional Type I construction. In other words, with all other variables held constant, the Type III arrangement will result in more efficient operation. Furthermore, for 115 volt and lower operating voltage levels, Type II constructions, with a restricted flux path, appear to be as efficient in operation as a conventional Type I riveted arrangement. It is believed that this results because the effect of the restricted flux path in the Type II construction is offset by eddy current losses in the rivets and internal stresses caused by riveting which affect the hysteresis characteristics of the Type I cores.

Although termination receiving means in the form of terminal receptacles 35, 36 have been shown in the preferred embodiment as illustrated for example in FIGS. 1 through 7, such receptacles may be omitted and the ends of the coils connected in a conventional fashion, e.g., by soldering or otherwise connecting the winding leads to external lead wires. However, when terminal receiving receptacles are provided, it is also desirable to provide winding lead accommodating passageways as illustrated at 42, 43. The inner winding leads may then be disposed in these passageways in a manner as will be understood to avoid contact between the innermost winding lead and the outer layers of winding turns.

In addition to eliminating the need and expense of rivets or other fasteners, a formed in situ insulating member provides the further advantages of eliminating the relatively great expense of inspection and repair of "integral insulation" coatings. As compared with preformed winding bobbins, a formed in situ insulating member also eliminates the necessity of handling separate preformed bobbin elements; and, in the case of "dog bone" shaped laminations 32, the use of separate sideboards are also eliminated. Furthermore, the formed in situ insulating member 30 intimately engages selected surfaces of the stack of laminations 32 (thus eliminating bobbin to core air gaps) and removes lamination stack height as a critical manufacturing dimension.

In fact, as will be described more completely hereinafter, lamination stacks that are stacked to within only about plus or minus one lamination thickness of a nominal stack height may be economically utilized with apparatus embodying the invention.

Figure 6:
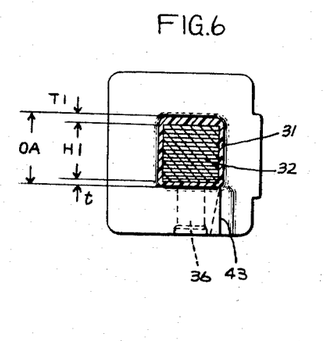
FIG. 6 is a sectional view, taken along lines VI—VI in FIG. 4.
Figure 7:
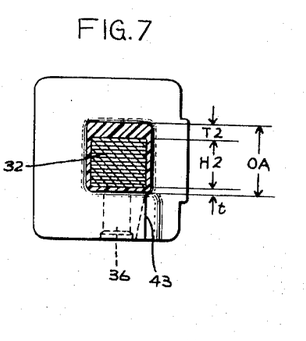
FIG. 7 is a view similar to FIG. 6 and differing therefrom in that the stack height of the winding accommodating laminations is less than the stack height of the winding accommodating laminations of FIG. 6.

A permissible range in stack heights of laminations nominally about 0.025 inch thick is quickly revealed by a comparison of FIGS. 6 and 7. In these figures, the overall dimension OA of an insulated winding accommodating structure is preselected and fixed. Furthermore, the minimum desired insulation thickness for a given insulating material is also fixed. However, the actual stack height of a stack of laminations for a given nominal stack height arrangement may vary within a range of heights wherein the permissible range between upper and lower stack height limits is preferably slightly more than two lamination thicknesses.

FIG. 6 illustrates a stack with an actual stack height H1 and an insulation material wall of thickness T1 that is at least equal to the minimum desired insulation thickness t.

It will be appreciated from an inspection of FIG. 6 that the actual insulation wall thickness T1 (measured along a line of measurement in the plane of FIG. 6 and across the stack of laminations) is substantially equal (i.e., with normal measurement error) to the overall dimension OA minus the sum of the preselected thickness t and the actual stack height H1. Furthermore, the actual insulation wall thickness along the same line of measurement is substantially equal to a preselected design thickness plus the difference between the actual stack height of the lamination stack and a predetermined maximum permissible stack height. In the special case of the FIG. 6 structure, the stack H1 of the lamination stack has been illustrated as being about equal to the maximum permissible stack height and, accordingly, the difference therebetween would be about zero.

In FIG. 7, the actual lamination stack height H2 was selected to approximately represent a minimum acceptable stack height and, therefore, the lower limit of an acceptable stack height range. In this example, the thickness T2 of the insulation wall along a vertical line of measurement in FIG. 7, would be near a maximum designed value. However, the relationships between the measurements H2, T2, OA, and t would remain the same as the relationships set forth above between the measurements H1, T1, OA and t shown in FIG. 6. By establishing and maintaining these dimensional relationships, it should now be understood that a group of laminations having a stack height approximating a nominal desired stack height may be quickly stacked together and thus eliminate the expense that would be associated with attempting to stack a fixed predetermined number of laminations to a precision stack height.

The manner and method by which preferred arrangements may be quickly and economically accomplished in practice will be discussed hereinafter in more detail in connection with FIGS. 17 through 22 of the drawings but first, a brief description will be presented of the structural arrangements shown in FIGS. 8 through 16.

Figure 8:
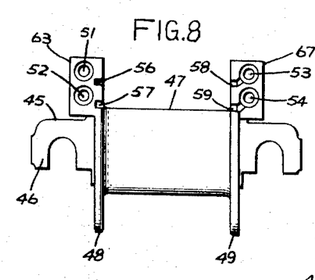
FIG. 8 is a view of another stack of winding accommodating laminations with an insulating member formed in situ thereon.
Figure 9:
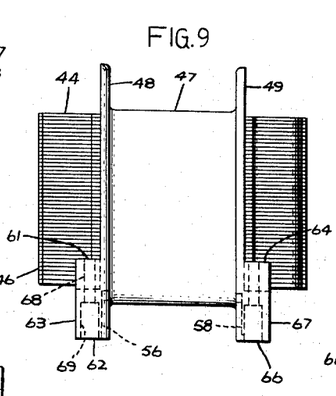
FIG. 9 is an elevational view of the structure shown in FIG. 8.
Figure 10:
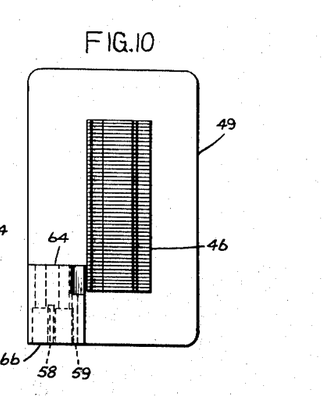
FIG. 10 is an end view of the structure of FIG. 9.

Turning now to FIGS. 8 through 10, a stack 44 of laminations 46 having a generally rectangular configuration rather than a "dog bone" configuration are shown with an insulating member formed in situ that includes a ground insulation segment 47, and a pair of sideboards 48, 49. Each of the sideboards includes receptacles for receiving the ends of winding leads and external leads connected thereto. These receptacles are identified by the reference numerals 51, 52, 53 and 54. Also included are coil lead receiving passages or slots 56 through 59 which may be used for the same purpose as the passageways or slots 42, 43 in FIG. 3.

The receptacles 51 through 54 are provided with different sized openings at opposite end surfaces 61, 62 of termination block 63 and ends 64, 66 of termination block 67. For example, the receptacle 51 is shown as having a first diameter along a first segment 68 thereof and a second larger diameter along a second segment 69 thereof. However, it will be appreciated that the intended result could also be accomplished by providing a smoothly tapered internal receptacle surface. By providing the receptacles with a differing configuration as viewed at either end of the termination blocks, the receptacles and blocks can be used to provide mechanical stress relief means for the connection between a winding lead and external lead.

For example, an external lead may be introduced through the portion 61 of the receptacle 56 and pulled through the larger portion 69 of the receptacle. The external lead may then be connected by a conventional solder joint or crimped connector to a winding lead. The connection would then be pulled back into the region 69 and, as the connection encountered the constricted part of the receptacle passageway, the connector and external lead would be held in place and the winding lead relieved from stresses that would otherwise be imparted by pulling on the external lead.

Although only four termination receptacles have been illustrated in FIGS. 8 through 10, three or more receptacles could be provided in the vicinity of each corner of each of the sideboards 48, 49 in order to accommodate at least 24 separate winding connections. This could be useful, for example, when the stack of winding accommodating laminations are utilized as the core section of a multi-speed motor which utilizes a plurality of winding sections. Other uses would be with the core section of a transformer or combination transformer-motor of the type used, for example, as drive motors and lamp energization means in some movie projectors.

Figure 11:
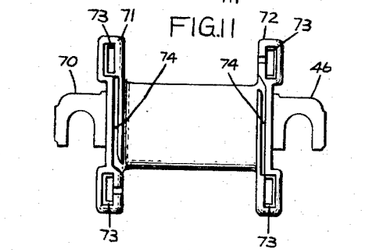
FIG. 11 is a view of still another stack of winding accommodating laminations with an insulating member formed in situ thereon.
Figure 12:
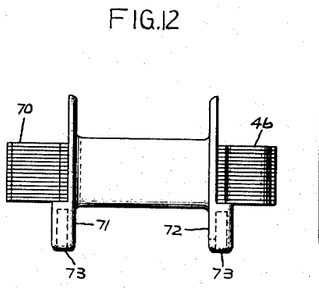
FIG. 12 is an elevational view of the structure shown in FIG. 11.
Figure 13:
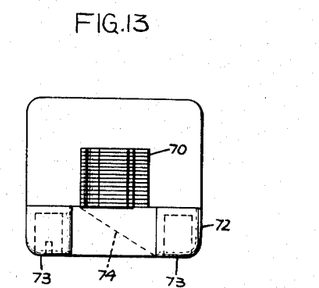
FIG. 13 is an end view of the structure of FIG. 12.

Turning now to FIG. 11, still another embodiment is illustrated wherein a stack 70 of laminations substantially identical to the laminations 46 of FIGS. 8 through 10 are arranged with an insulating member formed in situ thereon. The insulation member includes sideboards 71, 72 with termination receptacles 73 and winding lead passageways 74.

Figure 14:
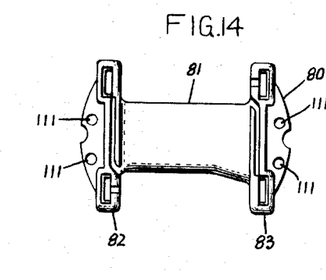
FIG. 14 is a view of yet another structure including a stack of winding accommodating laminations and a formed in situ insulating member.
Figure 15:
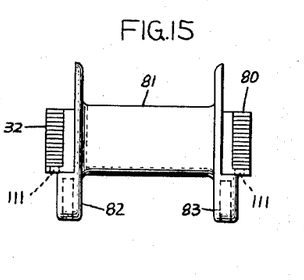
FIG. 15 is an elevational view of the structure shown in FIG. 14.
Figure 16:
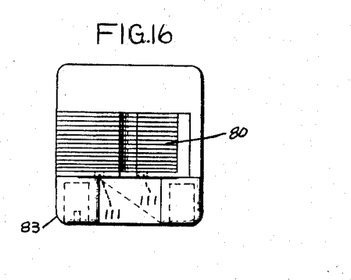
FIG. 16 is an end view of the structure of FIG. 15.

In FIGS. 14 through 16, a stack 80 of individual laminations substantially identical to the laminations 32 shown in FIGS. 1 through 7 are provided with an in situ formed insulating member having a first section 81 intimately engaging selected surface portions of the stack 80. The section 81 both secures the stack 80 together and provides a dependable and economical ground insulation member. Also included as part of the insulating member are flanges 82, 83 with termination receptacles and passageways similar to the receptacles and passageways 73, 74 in FIGS. 11 through 13.

In each of the above described arrangements, an insulating member is formed in situ and need not include winding locating means (illustrated for example as sideboards). Furthermore, in each of the arrangements, the illustrated stack of laminations has an actual stack height within a preselected range of stack heights with the thickness of at least one wall of the insulating member being variable and established during manufacture so as to maintain a preselected overall height for the insulated winding accommodating structure.

A formed in situ insulating member has also been used in each of the illustrated arrangements to secure a stack of laminations together without the use of other stack fastening means. However, additional stack fastening means could be used if desired. Furthermore, by forming the insulating member in situ, various relationships that have heretofore been considered to be critical but expensive to maintain (such as the relationship of lamination stack height to a preformed bobbin bore dimension), have been eliminated. Still another advantage will now be understood to be the ease with which an insulating member having wide variations in shapes and sizes may be formed in situ on a lamination stack.

Thus, the present invention facilitates the attainment of substantially all of the advantages that have previously been associated with the use of preformed insulating bobbins while virtually eliminating the disadvantages associated therewith. Moreover, the advantages associated with formed insulating members may now be realized in structures made up with irregular, e.g., "dog bone" shaped, laminations.

Turning now to FIGS. 17-22, there will be described a preferred form of apparatus embodying the invention. With the illustrated apparatus, a stack 88 of laminations 32 is placed into molding apparatus 90, and an insulating member having a predetermined desired configuration is formed in situ around the stack 88 in a closed cavity defined by the molding apparatus.

Figure 17:
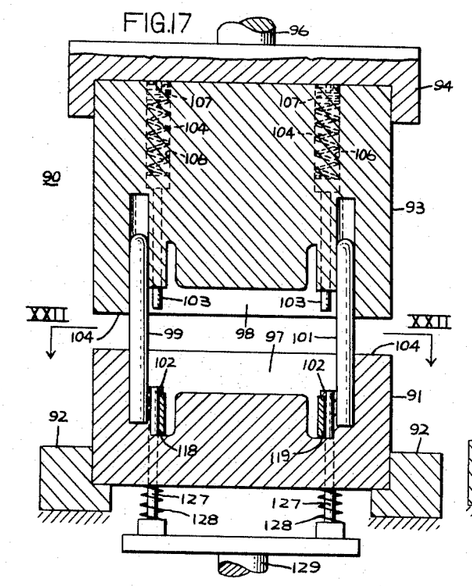
FIG. 17 is a mechanical schematic view, partly in section, of apparatus that may be used to form the structures shown in FIGS. 3–7.

As shown in FIG. 17, the apparatus 90 includes a lower mold part 91 supported upon a suitable base 92, an upper mold part 93, and power means which include a press head 94 powered through rod 96 by suitable means such as a not shown hydraulic cylinder so as to open and close the mold parts 91 and 93. The mold parts 91, 93 define a closed cavity region. When the parts 91, 93 are held together, the spaces 97, 98 form a closed cavity.

During operation of the apparatus 90, the head 94 raises the mold part 93 from the mold part 91 and a stack 88 of laminations having a stack height within a preselected stack height range are dropped between lamination alignment pins 99 and 101 with the locating ways 39, 41 (best shown in FIG. 3) cooperating with the pins 99, 101 to align the laminations on the mold part 91.

The laminations then rest against abutment means which include the locating surfaces 102. In the apparatus shown, this resulted in lower insulation wall having a thickness of about 0.032 inches (corresponding to dimension $t$ in FIG. 6) which has been found to be satisfactory when nylon is used as the insulating material. The spatial relationships of these parts will be most readily understood by referring to FIG. 17 in conjunction with FIG. 22. After placing a lamination stack in the apparatus 90, the upper mold part 93 is closed against the lower mold part 91 with a preselected force, and the surfaces 104 nest against one another to prevent the undesired escape of insulating material from the closed cavity. In the manufacture of the FIG. 3 insulated structure, the mold parts were held closed by a 30 ton press while an unhardened polyamide resin at a temperature of about 580°F. was moved under a pressure of about 12,000 psi into the closed cavity. More specifically, the resin was commercially available nylon material. One such readily available nylon material is marketed under the registered name ZYTEL 101 resin by the E. I. du Pont de Nemours & Co., Inc. It should be understood, however, that the material chosen for use may be any suitable thermoresponsive material, i.e., thermoplastic or thermosetting, and the mold clamping force used will depend on cavity surface areas, internal pressure in the closed cavity, viscosity of the unhardened molding material, and amount of flashing to be tolerated, among other things, all of which will be apparent to persons skilled in the art. Thus, if a low viscosity material is vacuum drawn into the mold cavity, less mold clamping force would generally be used than in the case of the specific material and cavity pressures identified above.

For ease of description, the mold part 91 has been illustrated as being supported by a fixed base 92, but it will also be understood that the base may be movable and travel in a suitable path to facilitate increased production rates. In addition, plural cavity molds or mold parts may be utilized although a single cavity arrangement has been shown in order to provide a concise description of a preferred embodiment.

As will be observed from the drawings, the stack of laminations essentially "floats" in the closed mold cavity between the stack position determining surfaces 102 and stack accommodating means which include stack clamping pins 103. Thus, the stack 88 is held in the mold cavity by the controlled application of a force thereto through the pins 103. Preferably, this force is substantially independent of the mold closing and holding force.

The desirability of limiting the amount of force used to compressively urge the stack of laminations against abutment surfaces in the closed cavity will be best appreciated by recalling some characteristics of laminated cores which are used to provide magnetic flux paths in inductive devices.

As will be understood, for a given flux density in a given laminated magnetic core under fixed power input conditions, heat is generated in the core. This phenomenon is one of the observable results of the undesirable characteristic referred to as "core loss". It is known that for a given core construction in a given application, increased mechanical stresses in the laminar structure of the core will generally increase the core loss in that construction. Most magnetic core structures with which I am familiar are annealed in order to relieve stresses within the individual laminations and/or core structure. For these and other reasons, it would be particularly undesirable to compress the stack 88 with a substantial force, e.g., clamping forces in the magnitude of thousands of pounds, while forming an insulating member in situ on the stack. Thus, it is contemplated that if the stack 88 were unduly compressed, permanent deformation of the core structure could result, causing an increase in internal stress and a concomitant increase in core loss. It is also surmised that an insulating member hardened in situ on a core structure being held under compression by mold closing forces would tend to hold the structure under undue compressive stress after removal from a mold cavity and thereby contribute to increased core losses. Although the actual core loss increase that could result from compressing the lamination stack 88 with a multiton mold closing force has not been quantitatively analyzed for the applications described herein, other advantages of providing accommodating means for a lamination stack within a closed cavity will be readily apparent. For example, lamination stacks having a height within a preselected range may have an insulating member formed in situ thereon by the practice of the present invention without resort to the expensive practice of attempting to establish a lamination stack height with close tolerance precision.

"Floating" of a lamination stack within the illustrated closed cavity will now be more particularly described by having reference again to FIGS. 17 and 18. After the mold parts 91, 93 have been separated to permit placement of a lamination stack on the surface 102, the top mold part 93 moves toward the mold part 91. Just prior to closing of the mold parts, the stack clamping pins 103 compressively urge the stack 88 with a preselected resultant force against the surfaces 102. This resultant preselected force is substantially less than the resultant force with which the mold parts 93, 91 are held against each other.

Figure 18:
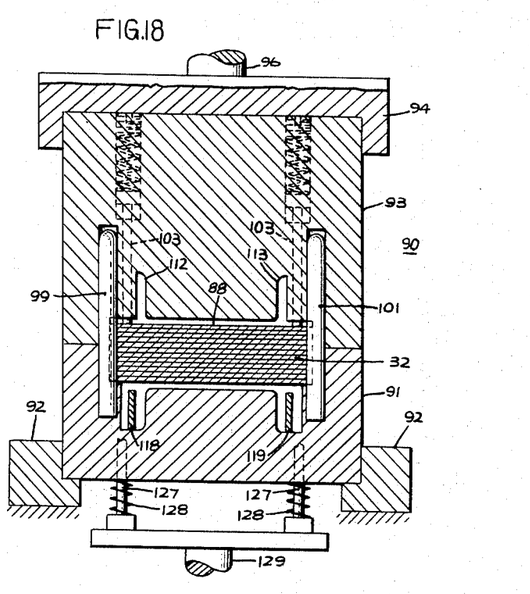
FIG. 18 is a view of the apparatus of FIG. 17 and includes a stack of winding accommodating laminations having a maximum stack height relative to a range of stack heights that may be accommodated by the apparatus.

In the structure shown in FIGS. 17 and 18, the pins 103 are carried through an interconnection permitting lost motion between the pins and upper mold part 93. The pins are held against the lamination stack by springs 104 that are trapped in spring receiving chambers 106 in the upper mold part 93. As the mold part 93 closes on mold part 91 and the pins 103 bear on the lamination stack, the springs are compressed between retaining screws 107 and the spring engaging ends of the pins. Although only two pressure pins 103 are revealed in FIGS. 17–20, four pins are carried by the mold part 93 in the same relative position as the ejection pins 127 shown in FIG. 22.

Thus, the illustrated structure includes pressure relief means interposed between a mold closure force applying member and a stack accommodating means. However, it will be appreciated that magnetic forces or other accommodating means that substantially completely isolate the lamination stack from the mold closing forces may also be utilized.

In addition, although lamination stack abutment means have been illustrated as being carried by one mold part and stack height accommodating means carried by another mold part with a lamination stack sandwiched therebetween, it will be understood that more than two mold parts may be used and that the abutment means and stack accommodating means may be carried by a single mold part. Furthermore, it will be appreciated that a lamination stack of appropriate configuration could be stacked on edge in a mold part such as the mold part 91 rather than on a lamination surface as shown.

In the apparatus 90, I have found that for nominal stack heights of one-half inch, three-quarters inch, and 1 inch, satisfactory results are obtained when the pins 103 are each urged against the lamination stack with a force of approximately 50 pounds per pin. Thus, even when the mold parts close upon each other with a resultant force of approximately 30 tons, the stack of laminations are compressed with a resultant force of only about 200 pounds and this may be accomplished with mechanical, hydraulic, or air springs.

Figures 19, 20, 21:
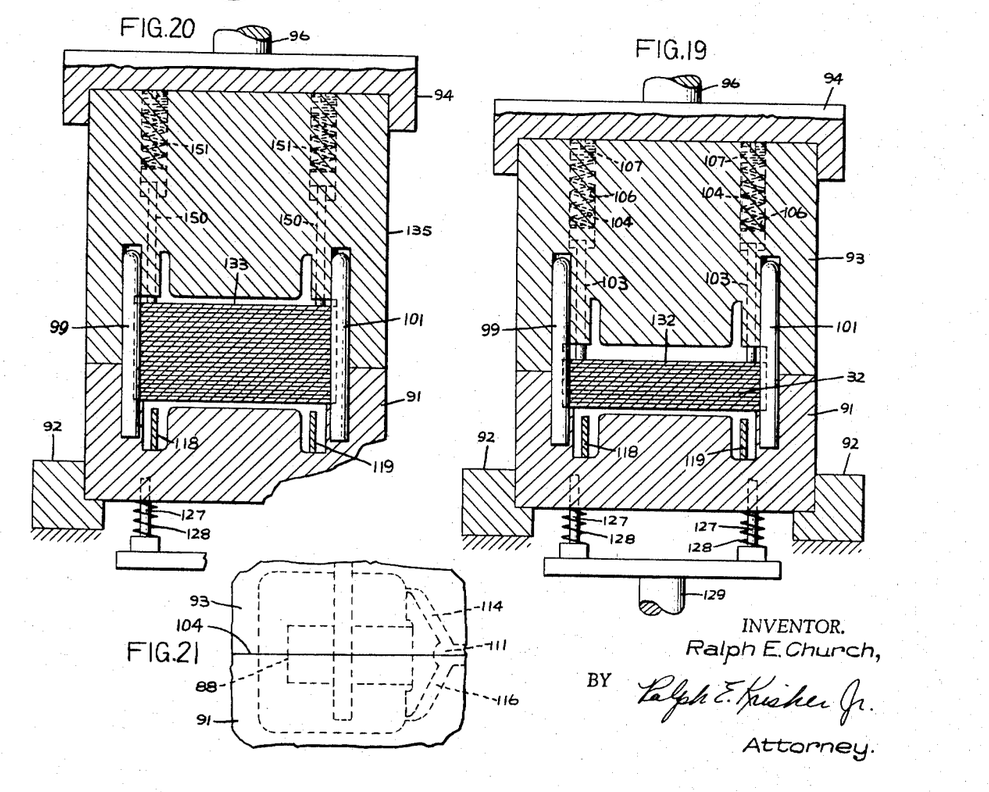
FIG. 19 is a view similar to FIG. 18 and includes a stack of winding accommodating laminations having a stack height less than the stack height illustrated in FIG. 18.
FIG. 20 is a view similar to FIG. 18 but showing modified apparatus that may accommodate laminations with a range of stack heights, the nominal height of which is greater than that which may be accommodated by the apparatus of FIG. 18.
FIG. 21 is a schematic side elevation, with parts broken away, illustrating one arrangement for admitting insulating material to a closed cavity in the apparatus of FIG. 18.
Figure 22:
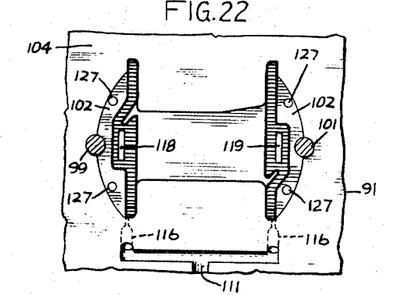
FIG. 22 is a view taken along the lines XXII—XXII in FIG. 17.

FIGS. 21 and 22 illustrate a suitable sprue and runner system that may be used for admitting an unhardened thermoplastic material such as nylon resin to the apparatus 90. With the illustrated arrangement, material is admitted through passageways 111, 114, and 116 to the closed cavity at four spaced apart locations. After the unhardened insulating material has been formed around the stack of laminations 88 and termination receptacle forming inserts 118, 119 carried by the mold part 91, the insulating material is hardened at least a sufficient amount to permit removal of the lamination stack with an insulating member formed in situ thereon from the mold cavity.

To assist in removal of the insulated structure from the mold, an ejector mechanism may be used. In FIGS. 17-20 and 22, this mechanism is illustrated as including four ejector pins 127 which are urged against the bottom lamination in the stack 88 against the bias of a pair of coil spring retractors 128 by an actuator 129 which may be mechanically, hydraulically, or pneumatically operated.

In FIG. 19 there is illustrated the same apparatus 90 as shown in FIGS. 17 and 18. However, in this figure a stack 132 of laminations 32 has been illustrated to reveal accommodation of the apparatus to a stack of laminations having a stack height approximating the minimum stack height in the range of heights to be accommodated.

Recalling the discussion presented previously concerning FIGS. 6 and 7, it will now be understood that when the stack of laminations 32 are positioned in the mold part 91 the pressure pins 103 will hold the laminations against the locating surfaces 102 and a larger cavity will then exist within the upper mold part 93 in FIG. 19 as compared to FIG. 18. However, the pins 103 continue to exert a force of approximately 50 pounds each against the stack 132. The larger FIG. 19 cavity is then filled with insulating material.

It will therefore be understood that it is preferred for the apparatus to facilitate positioning a stack of laminations having a stack height within a preselected range of stack heights in a mold cavity and locating the stack against an abutment; compressively holding the stack of laminations against the abutment while substantially isolating the laminations from the application thereto of mold closing forces; and forming an insulating member in situ on the stack of laminations with a moldable material.

In FIG. 20, a stack of laminations 133 of approximately twice the stack height of the stack 88 is illustrated. Accordingly, an upper mold part 135 with a deeper cavity therein is used with the mold part 91 in lieu of the mold part 93. The mold part 135 is similar in all respects to the mold part 93 with the exception that the pins 150 are biased against the lamination stack, during formation of an insulating member, with a force of about 200 pounds per pin. This is effected by using relatively stiff springs 151 and has been found to be helpful in preventing an insulated stack 133 from sticking in the mold part 135 when the mold is opened.

Somewhat surprisingly, structures formed by utilizing apparatus embodying the invention in the form hereinabove described have exhibited improved characteristics as compared with prior structures. One of the more important of these characteristics involves the leakage of current from a winding (e.g., winding 14 in FIG. 1) to ground through a laminated core (e.g., core section 16 in FIG. 1).

In one specific test procedure for determining leakage current, motors similar to the motor 10 shown in FIG. 1 and commercially available competitive motors were tested by first applying a 115 volt, 60 Hz potential across each winding lead and a ground connection that was made by threading a self-tapping screw into the lamination stack of the wound core section. Connected in series between the winding lead and source was a precision 1 ohm resistor and the voltage drop across the resistor was monitored with a high input impedance voltmeter connected across the resistor. Leakage current levels, in microamperes, were then read directly from the meter. This test set up and the equipment used was very analogous to test procedures and equipment specified by at least one well-known non-profit testing laboratory. Any voltage drop across the precision resistor was read directly from the voltmeter as leakage current from the winding to ground, as will be understood.

All initial tests were made in an air environment at approximately 70°F. and 35 percent relative humidity. The test units were then placed in a humidity cabinet maintained at 100°F. and 95-100 percent relative humidity. The units were then removed after 24 hours and the leakage current test repeated in the air environment. After each test, the test units were replaced in the humidity cabinet and additional leakage current tests were made at the end of 3, 7, 9, and 15 days of substantially continuous exposure to 95-100 percent relative humidity at 100°F.

Only the leakage current readings at the end of 24 hours and 7 days are tabulated below, since the particular devices tested were specifically intended for use in circulating air in the cooling chamber of refrigerators, and it was believed that in actual use the devices would not probably be exposed to high humidity conditions for periods in excess of seven days. Furthermore, the data presented below is limited to motors most similar to the motor illustrated in FIG. 1 and the competitive motors were provided with a one piece "slip-on" nylon bobbin or spool as described for example in Lilja U.S. Pat. No. 2,010,869.

The minimum thickness of ground insulation separating the motor winding and lamination surfaces in the motors embodying the invention was about 0.032 inches, and it is believed that this was also the minimum thickness of the slip-on bobbins in the competitive motors.

The data from these tests is presented below in Table II which shows the arithmetic average of readings for each test group. Test group A consisted of 11 units embodying the invention; test group B consisted of 16 units embodying the invention; test group C consisted of 10 competitive type motors using one piece nylon slip-on bobbins as insulating members; and test group D consisted of five competitive type motors using one piece slip-on nylon bobbins as insulating members.

TABLE II

| Test Group | n = number of units in test group | MICROAMPERES initial 70° F., 35% RH | 24 hours at 100° F., 95-100% RH | 7 days at 100° F., 95-100% RH |
|---|---|---|---|---|
| A | 11 | 6.75 | 17.4 | 48.9 |
| B | 16 | 4.17 | 7.87 | 27.6 |
| C | 10 | 5.8 | 19.8 | 238.7 |
| D | 5 | 4.56 | 141.2 | 260* |

*This is an average value for three of the five test units for the indicated test; attempts to measure the leakage current for the other two group D units under these conditions resulted in destruction of 500 microampere protective fuses.

The significance of this data becomes more apparent when it is recalled that the level of human perception of electrical shock, under average conditions, is approximately 200 microamperes, and under special conditions, 50 microamperes.

Thus, it will be appreciated from the data presented in Table II above that after exposure for 24 hours to 100 percent relative humidity, the test units embodying the invention had an average leakage current value well below the level of perception even under special conditions while the average leakage current for the test motors in group D was above the level of perception, at least under special conditions. Some of the more surprising results that are attributed to the present invention are the test results after exposure for seven days to 95-100 percent relative humidity. After seven days, the average leakage current level of units in test groups A and B was still below the level of perception even under special conditions, whereas the average values of leakage current for the competitive motors were actually in excess of the level of perception under average conditions. In fact, the leakage current in some of the group D units could not be measured because protective fuses were blown.

It is believed that this surprisingly improved characteristic is attributable to the intimacy with which insulation members formed in situ according to the invention engage the surfaces of the laminations in the units embodying the invention. It is also believed that it is self-evident that a formed in situ insulating member will result in improved heat dissipation characteristics of an inductive device during operation.

From the foregoing, it will now be appreciated that the invention disclosed herein not only accomplishes the earlier stated objects of the invention but results in structural arrangements having still other improved characteristics as compared with prior known arrangements.

While the present invention has been described with reference to particular embodiments and exemplifications thereof in accordance with the Patent Statutes, it is to be understood that modifications may be made by those skilled in the art without actually departing from the invention. Therefore, I intend in the appended claims to cover all such equivalent variations as come within the true spirit and scope of the invention.

What I claim as new and desire to secure by Letters Patent of the United States is:

1. Apparatus for use in forming an insulating member on an inductive device core comprising a plurality of inductive laminations arranged in a stack having a stack height within a preselected range; said apparatus comprising at least two members, each of the two members including a surface for defining at least a portion of a closed cavity for receiving a moldable insulating material; at least one of the two members being movable toward the other of the two members to establish a closed cavity; means for exerting a compressive force on the inductive device core within the closed cavity with winding accommodating regions of the core spaced from surfaces of the mold bounding the cavity so that insulating material may be formed along the winding accommodating regions and between such regions and the mold surfaces spaced therefrom; means for limiting movement of the inductive device core in at least one direction in the closed cavity; and power means for urging the two members together to prevent the escape of insulating material from the closed cavity; said means for exerting a compressive force including core accommodating means for holding laminations in stacked relation having a height within the preselected range in predetermined compressed relationship with the means for limiting movement at least until moldable insulating material is formed as a substantially solid insulating body adjacent to the winding accommodating regions of the core within the closed cavity, whereby the plurality of laminations are held in compressed relationship and yet substantially isolated from the forces incident to urging the two members together.

2. The apparatus of claim 1 wherein said care accommodating means comprises at least one element arranged to engage a stack of laminations within the closed cavity and further comprising means interconnecting said at least one element and one of the two members for relative movement.

3. The apparatus of claim 1 wherein the means for limiting movement includes a surface formed on at least one of the two members; and the core accommodating means includes a plurality of elements interconnected through lost motion connection means to at least one of the two members whereby an inductive device core within the closed cavity is urged against said surface by the plurality of elements.

4. Apparatus for use in forming an insulating member in situ on a stack of inductive laminations having a stack height within a preselected range and having at least two spaced apart winding accommodating surface regions, said apparatus including at least two mold members; at least one of the mold members being movable from a first position spaced from the second mold member to a second position adjacent to the second mold member; said at least two mold members having cavity defining surfaces that establish a closed cavity when the at least one of the mold members is in the second position; power means for moving said at least one of the mold members to the second position; locating means for establishing the location of a first surface of a stack of laminations within the closed cavity so that the spaced apart winding accommodating surface regions of the stack are spaced from internal mold surfaces whereby insulating material may be molded thereagainst; and means for substantially continuously urging the stack of laminations toward the locating means while insulating material is admitted to the cavity at least until a substantially solid insulating member is formed in situ on the stack of laminations, said means for substantially continuously urging being arranged to substantially isolate the stack of laminations from stresses due to the effect of at least part of a force applied to said at least one of the mold members in the second position whereby stacks of laminations having a predetermined range of stack heights may be accommodated in the closed cavity while moldable insulating material is formed in situ on the stack of laminations as an insulating member.

5. The apparatus of claim 4 wherein the mold members are held together with a force predetermined to contain moldable insulating material, under pressure, within the closed cavity, and the means for substantially continuously urging the stack of laminations includes a plurality of elements arranged to engage at least one surface of the stack of laminations.

6. The apparatus of claim 5 wherein at least one of the plurality of elements is supported by one of the mold members and is movable relative to said one of the mold members, said at least one of the plurality of elements being so movable as the second mold member moves to the second position.

7. The apparatus of claim 6 wherein the plurality of elements are supported through a lost motion connection by the at least one mold member and movable with the said mold member as said member moves through a first increment of travel from the first position, said lost motion connection permitting the plurality of elements to come to rest against a stack of laminations while said mold member moves through a final increment of motion to the second position.

* * * * *